S. CROLL.

Improvement in Journal-Bearings.

No. 4,914. Reissued May 28, 1872.

WITNESSES:

Benj Morrison

Wm H. Morrison.

INVENTOR:

Sylvester Croll

BEST AVAILABLE COPY 4,914

UNITED STATES PATENT OFFICE.

SYLVESTER CROLL, OF PHILADELPHIA, PENNSYLVANIA, ASSIGNOR OF TWO-THIRDS INTEREST TO REUBEN T. BARRETT AND EDWARD T. PLUSH, OF SAME PLACE.

IMPROVEMENT IN JOURNAL-BEARINGS.

Specification forming part of Letters Patent No. 124,485, dated March 12, 1872; reissue No. 4,914, dated May 28, 1872.

Specification describing certain Improvements in Journal-Bearings, invented by SYLVESTER CROLL, of the city of Philadelphia, in the State of Pennsylvania.

The first part of my invention relates to the production of an argilo-vitreous bearing composition, consisting of silex or sand and clay, mixed with arsenious acid, soda, bone-dust, oxide of lead, and manganese fused together, and while in the fused condition run into and compressed within the bearing-box, previously heated and fitted upon a removable "former," which will give the bearing face of the fused mass, the curve required for the journal, and finally annealing the same for use.

The second part of my invention relates to the construction of the box with an opening in its bottom for the purpose of introducing the fused mass for the bearing, and the plunger for compressing it therein, and with recesses or projections at the inner sides near the upper edges of the said box, for the purpose of preventing the argilo-vitreous bearing from getting loose or becoming detached.

Figure 1:
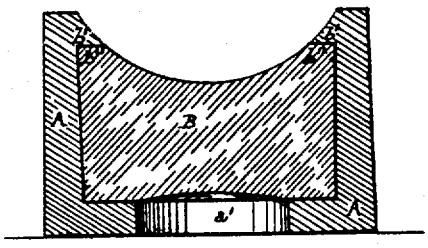
Figure 2:
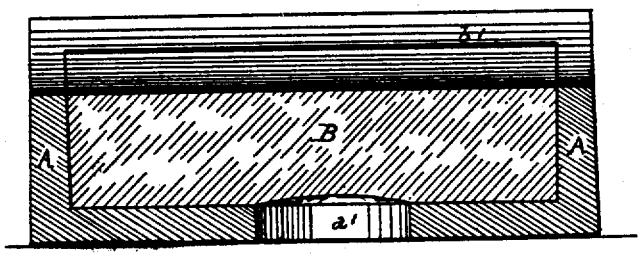

Figure 1 is a vertical transverse section of the box with its contained argilo-vitreous bearing. Fig. 2 is a vertical longitudinal section through the center of the same.

The box A is cast of iron, and has a hole, *a'*, through the bottom, for the introduction of the fused mass which is to form the bearing, and also to admit of the introduction of any suitable plunger-rod or piston for the purpose of compressing the mass, so as to cause it to fill all the recesses or empty spaces in the corners of the box. The upper edges of the two ends of the box B are curved to correspond with the curve of the journal which is to work therein; and the inner sides of the upper side edges have projections *b' b'*, which give recesses *b'' b''* respectively, into which the fused mass will be forced by the action of the plunger, (not shown,) and thus the bearing B firmly and securely retained when cold.

In the construction of the bearing B take one hundred pounds of clean sand or silex, fifty pounds of clay, and add twenty pounds of sal-soda, twenty pounds of bicarbonate of soda, ten pounds of arsenious acid, thirty pounds bone dust, thirty pounds of oxide of lead, and eight ounces of oxide of manganese; and after mixing them thoroughly together, fuse the compound in the same manner practiced in the production of porcelain.

Now, having the metal box A firmly held down upon the removable former, (not shown,) which is to give the curve for the reception of the journal and well heated, pour the hot semi-fluid mass which is to form the bearing B, through the hole *a'* until the box and hole are filled therewith, and immediately pressure upon the plastic contents of the box, by means of any suitable plunger or piston applied in the hole, and press with sufficient force to cause the plastic mass to penetrate and fill up all the recesses or cavities within the box, before the mass has become set by cooling. After the bearing thus produced has become hard by cooling, the plunger or piston and the "former" may be detached, and the box A with its contents B then set aside in an annealing-oven to become gradually and slowly cooled down for use.

I have had these journal-bearings and boxes in constant use under some of our city railway horse-cars during the last six months, and they do not show the slightest evidence of wearing away in either the bearings B, or the journals which rotate thereon, and consequently they give entire satisfaction to the managers of the said roads.

I claim as my invention—

1. Journal-bearings, composed of the materials hereinbefore set forth, substantially in the proportions specified.

2. I also claim the box A, when the same is constructed with an opening, *a'*, in its bottom, and projections *b' b'* or recesses *b'' b''* inside of the top edges of the sides of the said box, substantially as and for the purposes hereinbefore set forth.

Witnesses: SYLVESTER CROLL.

BENJ. MORISON,

WM. H. MORISON.